United States Patent
Hochmuth et al.

(10) Patent No.: US 7,944,451 B2
(45) Date of Patent: May 17, 2011

(54) PROVIDING PIXELS FROM AN UPDATE BUFFER

(75) Inventors: Roland M. Hochmuth, Fort Collins, CO (US); Robert P. Martin, Fort Collins, CO (US); Andrew D. Thomas, San Mateo, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 918 days.

(21) Appl. No.: 11/830,930

(22) Filed: Jul. 31, 2007

(65) Prior Publication Data

US 2009/0033670 A1  Feb. 5, 2009

(51) Int. Cl.
*G06F 13/00* (2006.01)
*G06F 12/02* (2006.01)
*G09G 5/36* (2006.01)
*G09G 5/02* (2006.01)

(52) U.S. Cl. ........ 345/536; 345/537; 345/538; 345/543; 345/545; 345/589

(58) Field of Classification Search .................. 345/539, 345/543, 536–538, 545, 589
See application file for complete search history.

(56) References Cited

U.S. PATENT DOCUMENTS

| | | | | | |
|---|---|---|---|---|---|
| 4,823,108 | A | * | 4/1989 | Pope | 715/806 |
| 5,261,072 | A | * | 11/1993 | Siegel | 710/22 |
| 5,457,477 | A | * | 10/1995 | Wang et al. | 345/589 |
| 5,831,639 | A | * | 11/1998 | Conticello | 345/556 |
| 6,233,634 | B1 | * | 5/2001 | Clark et al. | 710/313 |
| 7,274,368 | B1 | * | 9/2007 | Keslin | 345/522 |
| 2002/0063715 | A1 | * | 5/2002 | Foran | 345/501 |
| 2003/0058248 | A1 | * | 3/2003 | Hochmuth et al. | 345/537 |
| 2003/0079919 | A1 | | 5/2003 | Hochmuth et al. | |
| 2003/0080971 | A1 | | 5/2003 | Hochmuth et al. | |
| 2003/0234749 | A1 | | 12/2003 | Marks et al. | |
| 2004/0207630 | A1 | * | 10/2004 | Moreton et al. | 345/543 |
| 2005/0184993 | A1 | | 8/2005 | Ludwin et al. | |

OTHER PUBLICATIONS

Baratto, R. A., et al., "THINC: A remote Display Architecture for thin-Client Computing", Technical Report CUCS-027-04, Department of Computer Science, Columbia University, Jul. 2004, 15 pp., http://www.ncl.cs.columbia.edu/publications/cucs-027-04.pdf.
Richardson, T., et al., "Virtual Network Computing", IEEE Internet Computing, 2(1), Jan./Feb. 1998, 7 pp., www.cl.cam.ac.uk/research/dtg/attarchive/pub/docs/att/tr.98.1.pdf.
Schmidt, B. K., et al., "The Interactive Performance of SLIM: A Stateless, Thin-Client Architecture", In Proceedings of the 17th ACM Symposium on Operating Systems Principles (SOSP), vol. 34, pp. 32-47, Kiawah Island Resort, SC, Dec. 1999, http://www-suif.stanford.edu/~bks/publications/sosp_slim.pdf.
International Search Report and Written Opinion dated Jan. 29, 2009, 11 pages.
IPO, Office Action dated Feb. 25, 2010, Application No. GB10012540 filed Jul. 14, 2008.
WIPO, International Preliminary Report on Patentability, dated Feb. 11, 2010.

* cited by examiner

*Primary Examiner* — Kee M Tung
*Assistant Examiner* — Robert Craddock

(57) ABSTRACT

A method comprises storing pixel data in a frame buffer, retrieving the pixel data from the frame buffer and processing at least one pixel value of the pixel data to generate an output pixel bit stream. The method further comprises storing pixel values in a first update buffer. The pixel values are derived from the output pixel bit stream. The method also comprises providing the pixel values from the first update buffer across a network to a remote graphics system.

19 Claims, 5 Drawing Sheets

PROVIDING PIXELS FROM AN UPDATE BUFFER

BACKGROUND

Some electronic systems permit a user of one computer to view on his or her display images (graphics and text) that are generated on another computer remotely located from the user's computer. In some such systems, the remote computer where the graphics data is generated transmits images to the user's computer that causes the user's computer to replicate the images on the computer where the images originated. Unfortunately, the images viewed on the user's computer may not be identical to the images originally generated on the remote computer.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

DETAILED DESCRIPTION

Figure 1:
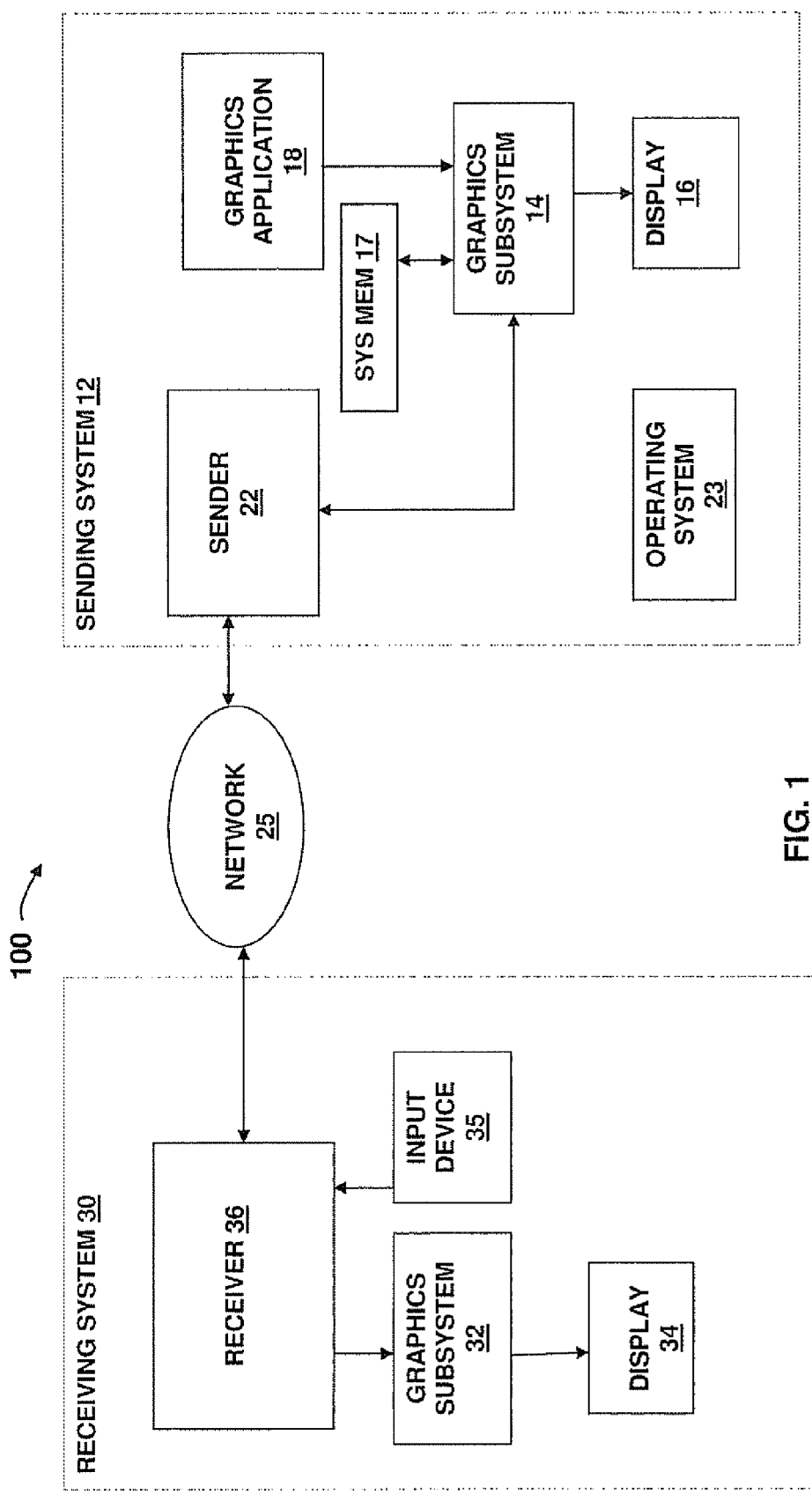
FIG. 1 shows a system in accordance with various embodiments.
Figure 2:
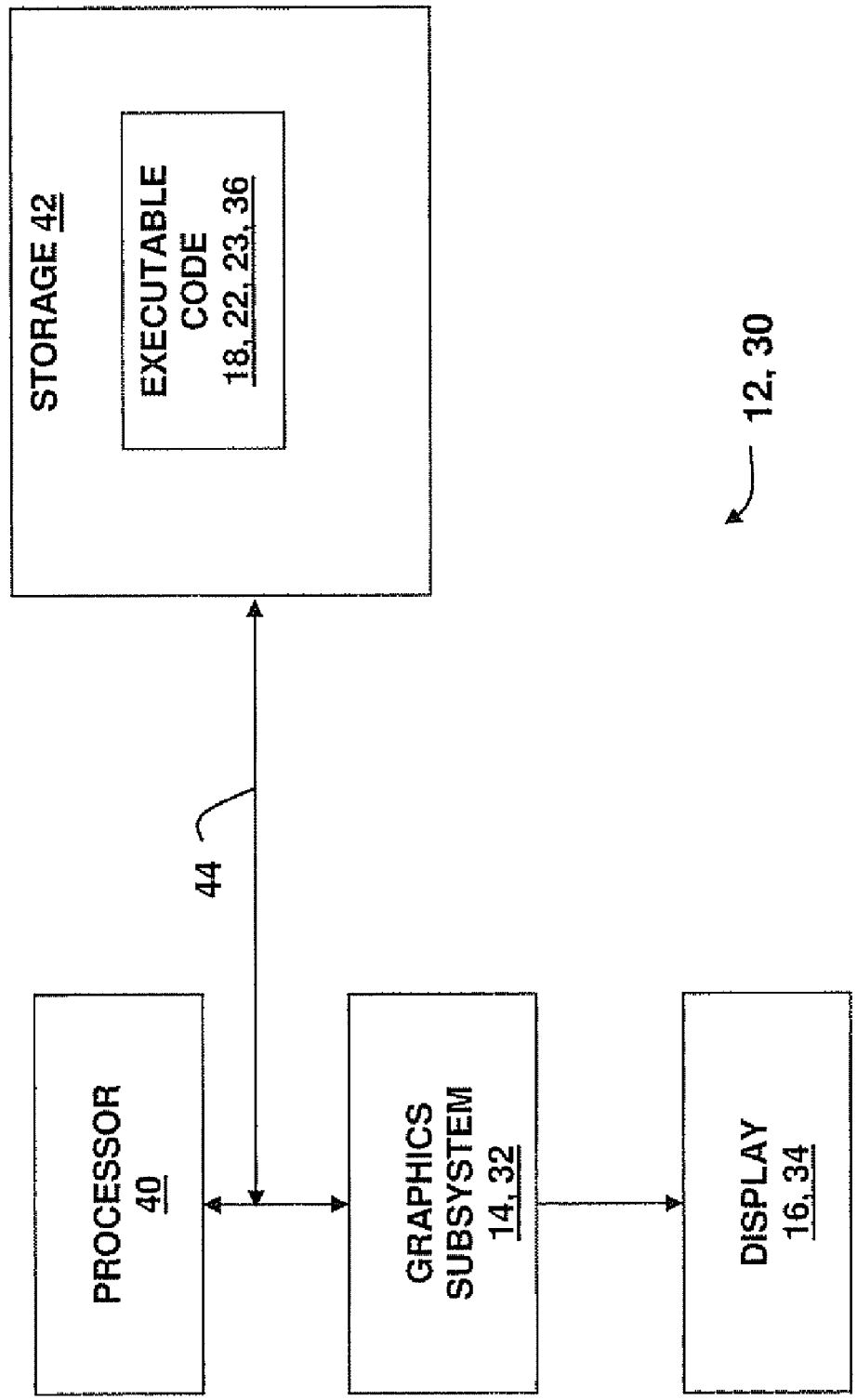
FIG. 2 a block diagram of at least a portion of the system of FIG. 1 in accordance with various embodiments.

FIG. 1 shows an embodiment comprising a system 100. System 100 comprises a sending system 12 and a receiving system 30 communicatively coupled via a network 25. Through the network, the systems 12 and 30 are communicatively coupled to each other. Network 25 may comprise the Internet or other form of communication network. Network 25 may include a point-to-point communication link, as well as multi-drop networks as are typical of local area networks. As shown, the sending system 12 comprises a graphics subsystem 14, a display 16, system memory 17, a graphics application 18, a sender 22, and operating system 23. The graphics application 18 and sender 22 comprise executable code. The receiving system 30 comprises a graphics subsystem 32, a display 34, an input device 35, and a receiver 36. The receiver 36 in the receiving system comprises executable code. Referring briefly to FIG. 2 in conjunction with FIG. 1, each of the sending system 12 and receiving system 30 comprises a processor 40 coupled to storage 42 and a graphics subsystem 14, 32 via a system bus 44. Each system 12, 30 also comprises a display 16, 34 coupled to the respective graphics subsystem 14, 32 as shown. Each executable code (i.e., the graphics application 18, the sender 22, the operating system 23, and the receiver 36) in the illustrated embodiment are executed by the respective processor 40 in that system and are stored in storage 42. Storage 42 may comprise volatile storage (e.g., random access memory), non-volatile storage (e.g., hard disk drive) or a combination thereof. The storage 42 of the sending system 12 may comprise the system memory 17 shown in FIG. 1. Each of the graphics subsystems 14 and 32 may comprise additional executable code such as application programming interfaces (APIs), graphics drivers, one or more hardware components such a graphics adapter, etc. Each graphics subsystem also includes at least one frame buffer into which pixel color values are temporarily stored to render pixels on the associated display.

In some embodiments, the sending system 12 has a display 16 coupled thereto, but in other embodiments, the sending system's display 16 is not included. The receiving system 30 may include an input device 35, such as a keyboard or mouse, which permits a user of the receiving system to effectively interact with the graphics application 18 as if the graphics application were being executed on the receiving system 30.

Referring to FIG. 1, sending system 12 executes a graphics application 18 that causes images (e.g., text, lines, fills) to be shown by the graphics subsystem 14 on the display 16. The graphics application 18 comprises any one or more of a plurality of executable programs that use a graphics API. The APIs used by the graphics application are implemented by the graphics subsystem 14. The graphics application 18 causes images to be shown on display 16 by providing graphics commands to the graphics subsystem 14 which creates and stores images, comprising pixel data, in a frame buffer in the graphics subsystem 14.

Figure 3:
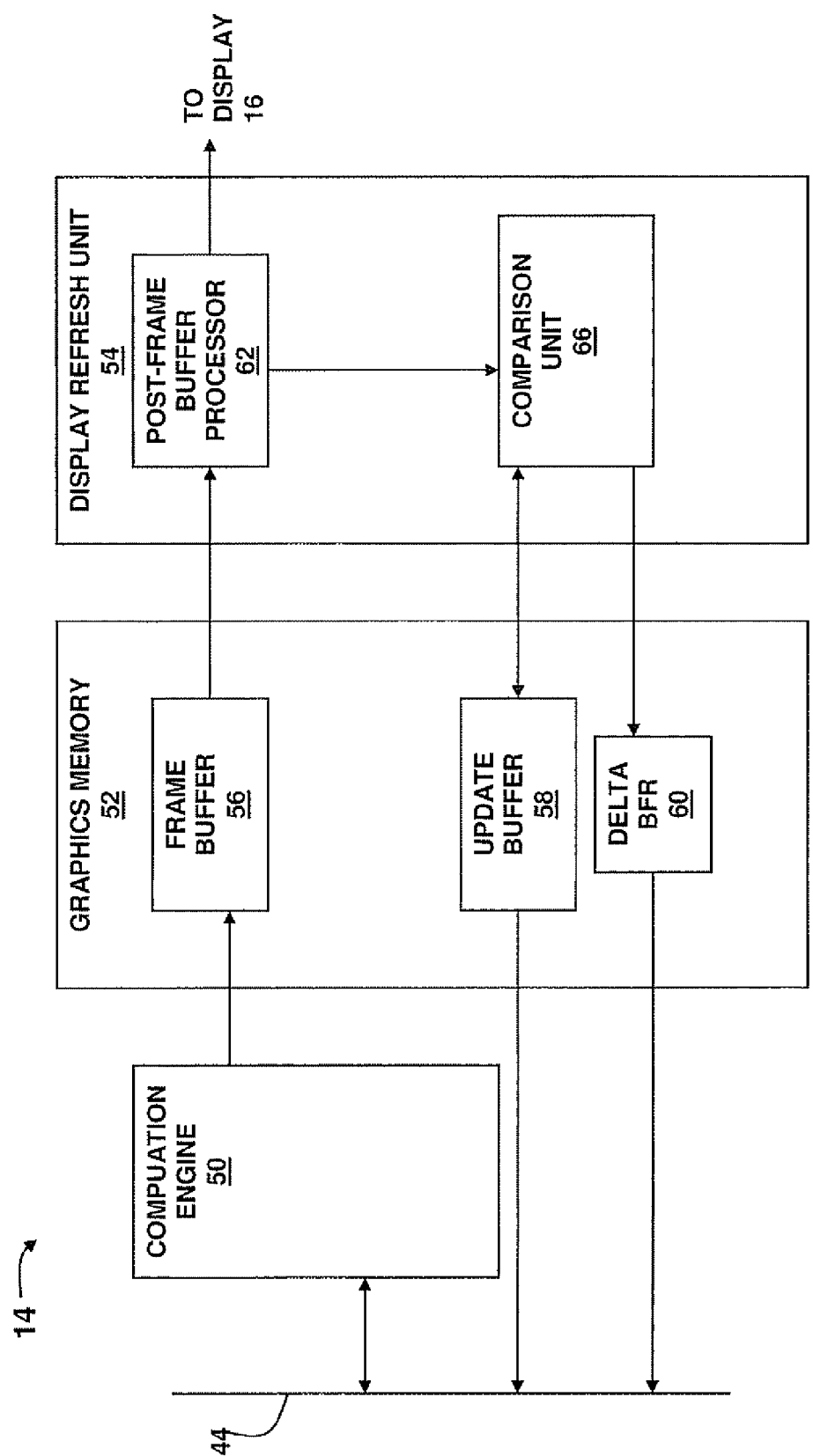
FIG. 3 illustrates a block diagram in which an update buffer is used in accordance with various embodiments.

FIG. 3 shows an embodiment of the graphics subsystem 14 of the sending system 12. In some embodiments, the graphics subsystem 14 comprises an add-in card installed in the sending system 12. As shown in FIG. 3, the graphics subsystem 14 comprises a computation engine 50 coupled to a graphics memory 52 which couples to a display refresh unit 54. In some embodiments, the computation engine 50, graphics memory 52, and display refresh unit 54 all comprise hardware components. The computation engine 50 receives graphics commands from the processor 40 of the sending system 12 and generates an image comprising pixel data. The computation engine 50 may also compress the pixel data. The computation engine 50 stores the pixel data in a frame buffer 56 implemented in graphics memory 52. The display refresh unit 54 comprises a post-frame buffer processor unit 62 that retrieves pixel data from the frame buffer 56 and, in some embodiments, performs additional processing on the pixel data from the frame buffer to generate an output pixel bit stream. Examples of such additional processing comprise color-space conversion, the implementation of color overlay planes, and application of gamma correction. Color-space conversion involves changing the output pixel bit stream from one color-space format such as Red-Green-Blue (RGB) to another format such as luminance-chrominance format (YCrCb). A format other than the native format of frame buffer pixel data may result in a format efficient process for determining the pixel values that are to be transmitted by the sending system 12 to the receiving system 30. In some embodiments, the pixel data in the frame buffer 56 comprise actual color values, while in other embodiments, the pixel data comprise color index values that are resolved into actual color values by the post-frame buffer processor unit 62. For example, the post-frame buffer processor unit 62 looks up color values from a color look-up table using the index values. The post-frame buffer processor unit 62 also converts the pixel bit stream to a format suitable for the particular display 16 coupled to the sending system 12. For example, the display refresh unit 54 may generate an output pixel bit stream in an analog format such as Video Graphics Array (VGA) or a digital format such as Digital Video Interface (DVI).

The sending system 12 provides a copy of the pixel data being presented on the display 16 to the receiving system 30 via the network 25. However, rather than transmitting the pixel data from the frame buffer 56 to the receiving system 30, the sending system 12 takes the output pixel bit stream from the display refresh unit 54, and specifically the post-frame buffer processor unit 62 and provides pixel values indicative of the output pixel bit stream to the receiving system 30 over the network 25. Because the output pixel bit stream has the effects of the post-frame buffer processor unit 62 encoded into it, the images transmitted to the receiving system 30 comprise what is being shown on display 16. If the pixel data from the frame buffer 56 was transmitted to the receiving system 30, such data would not be encoded with the effects of the post-frame buffer processor unit 62 and thus, the receiving system 30 might not show the same images as are shown on the sending system 12.

The graphics memory 52 of the graphics subsystem 14 of FIG. 3 also comprises an update buffer 58 and a delta buffer (BFR) 60. Update and delta buffers 58 and 60 are separate from the frame buffer 56. The update buffer 58 generally comprises a video frame that precedes, in time, the current frame encoded in the output pixel bit stream generated by the display refresh unit 54. The display refresh unit 54 also comprises a comparison unit 66. The comparison unit 66 receives a copy of the output pixel bit stream generated by the post-frame buffer processor 62. The comparison unit 66 compares, for example, on a pixel-by-pixel basis, the pixels encoded in the output pixel bit stream with the pixel values stored in the update buffer 58 to determine if the currently display image differs from a previous image (stored in the update buffer 58). In some embodiments, each successive pair of image frames are compared, while in other embodiments, image frames other than every successive pair are compared by the comparison unit 66. In some embodiments, for example, every other image frame is compared).

As a result of the comparison performed by the comparison unit 66, the comparison unit may determine that one or more pixels have changed while determining that other pixels have not changed between the previous image stored in the update buffer and the current image encoded in the output pixel bit stream of the display refresh unit 54. A relatively static image, for example, will have at least some pixels whose color values do not change from one image frame to the next. The comparison unit 66 overwrites the pixel values in the update buffer 58 that the comparison unit 66 determines have changed and does not overwrite (i.e., leaves alone) those update buffer pixel values that are determined not have changed. The overwrites may comprise replacement pixel values, or a difference value that is equal to the difference between the old and new pixel values. As a result of the pixel-by-pixel comparison and at least partial update buffer overwriting, the comparison unit 66, and thus the display refresh unit 54, in effect caused a copy of the output pixel bit stream to be generated and stored in the update buffer 58. Alternatively stated, the contents of the update buffer 58 reflect the image currently being shown on the sending system's display 16.

In various embodiments, the delta buffer 60 comprises a bit associated with each pixel whose color value is stored in the update buffer 58. The comparison unit 66 writes a delta buffer bit to a value of, for example, "1" to indicate that the pixel corresponding to that delta buffer bit has changed or to a value of "0" to indicate that the corresponding pixel has not changed. In some embodiments, the contents of the delta buffer 60 are initially 0 and thus the comparison unit 66 need only change certain bits to a value of "1" to indicate that a change in color has occurred to such pixels (i.e., a "0" value need be written to the delta buffer to indicate the absence of a color change). In other embodiments, a delta bit value of "0" indicates that the corresponding pixel has changed and a value of "1" indicates that the corresponding pixel has not changed. All of the bits in the delta buffer 60 may be initialized to a "0" value as noted above or to a value of "1."

In some embodiments, each bit in the delta buffer 60 pertains to a separate pixel in the update buffer. In other embodiments, each bit in the delta buffer 60 pertains to a group of pixels in the update buffer. For example, each delta buffer bit may pertain to an 8-by-8 group of pixels. The delta buffer bit corresponding to a group of pixels specifies whether any of the pixels in the group have changed.

In some embodiments, once the update and delta buffers 58, 60 have been updated, some or all of the contents of the buffers 58, 60 are written to system memory 17 via the system bus 44. In various embodiments, the graphics subsystem 14 writes to system memory 17 pixel values corresponding to only those pixels that have actually changed as indicated by the contents of the delta buffer 60. For example, the graphics subsystem 14 examines the bits in the delta buffer 60 and only writes those pixel values from the update buffer 58 that correspond to delta buffer bits that have been written by the comparison unit 66 to indicate that a corresponding pixel has changed. In some embodiments, all of the contents of the update and delta buffers 58 and 60 are written to system memory 17 and the sending system's host processor 40 examines the copy in system memory of the contents of the delta buffer 60 to determine which pixels have changed. The host processor 40 generates one or more image packets containing just the changed pixels based on the processor's examination of the delta buffer contents. In various embodiments, the host processor 40 compresses the pixel data to be transmitted over the network 25 to the receiving system.

In some embodiments, the sending system's host processor examines a delta buffer, and also combines adjacent blocks into larger blocks, or adjacent pixels into larger rectangular regions. For example, if d(0, 1) and d(0, 2) have been modified, where d is the delta buffer, the pixels to which d(0, 1) and d(0, 2) correspond would be combined into a single larger rectangle. Then, these larger regions are read back into system memory, compressed and transmitted to the receiving system. Thus, pixel regions that have changed that "touch" each other (are adjacent) are combined into larger regions so that the number of read operations are reduced. Reducing the number of read operations helps improve performance. Instead of reading many small rectangles, fewer but larger rectangles are read.

In various embodiments, each pixel value sent to the receiving system 30 is encoded with an X, Y screen coordinate to indicate to the receiving system's graphics subsystem the location the screen to which that pixel is to be applied. In other embodiments, a string of pixels could be encoded with a starting X and starting Y coordinate along with a length value to indicate the number of pixels to follow. Further still, a block of pixels (e.g., a rectangular group of adjacent pixels) could be encoded with a coordinate of opposite corners of the block (e.g., upper left and lower right). Yet another embodiment comprises the following method that works on a pixel-by-pixel basis:

```
struct Header
{
    Byte isModified;
    Color color;
}
``` where is Modified is a boolean value that indicates whether the pixel has been modified and color is an RGB or some other color space value that is optionally provided if is Modified is true.

Another possibility that works on a block-by-block basis is:

```
struct Block
{
    Byte isModified;
    Color colors[8, 8];
}
``` where is Modified is a boolean value that indicates whether any pixel in the block has been modified, and colors is a two-dimensional 8×8 array of color values. In this example the block has a size of 8×8 pixels, but any size block is possible. If any pixel in the block has been modified then the entire block is sent to the receiving system 30.

Thus, from system memory 17, pixel data indicative of the sending system's displayed images is provided over the network 25 to the receiving system 30. Such transmitted pixel data comprises less than a full screen or window's worth of pixel values if any of the pixels have color values that have not changed as explained above. The sending system 12 provides pixel values from system memory 17, and thus indirectly from the update buffer 58, across network 25 to a remote graphics system (receiving system 30). If the pixel data transmitted over the network 25 have been compressed, the receiver 36 decompresses the data and provides the pixel data to the graphics subsystem 32 to be shown on display 34. The image frame comparison process and the transmission of the resulting update buffer contents explained above repeats itself thereby causing the receiving system's display 34 to be updated with the images being generated by the sending system 12.

Figure 4:
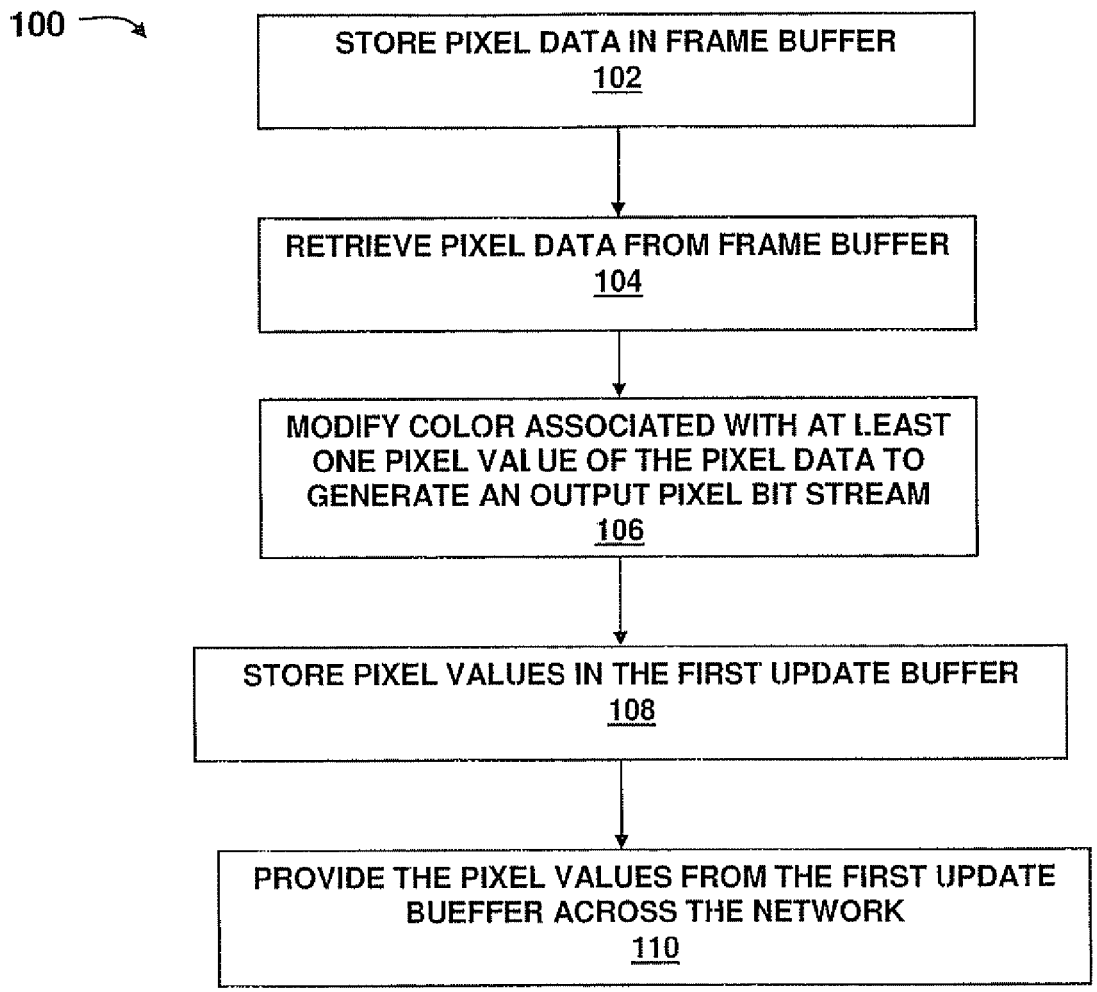
FIG. 4 shows a method in accordance with various embodiments.

FIG. 4 shows a method 100 in accordance with various embodiments. At 102, method 100 comprises storing pixel data in a frame buffer (e.g., frame buffer 56. At 104, the method comprises the display refresh unit 54 retrieving the pixel data from the frame buffer. As explained above, the display refresh unit 54 may apply any of various types of color modifications to the pixel data from the frame buffer (e.g., gamma) to produce an output pixel bit stream (106), as well as generate a video signal in a format compatible with the display 16 (e.g., VGA, DVI). At 108, method 100 comprises storing pixel values in a first update buffer. FIG. 3 illustrates an embodiment in which the graphics memory 52 comprises only a single update buffer 58, but in other embodiments as illustrated below, the graphics memory 52 comprises multiple update buffers 58. The pixel values stored in the first update buffer comprise the pixel values that have changed as determined during the comparison process in which the current image is compared to a previous image. At 110, method 100 comprises providing the pixel values from the first update buffer across the network 25 to the receiving system 30. In various embodiments, the pixel values provided from the update buffer comprise some, but not necessarily all, of the update buffer's pixels (e.g., only pixel values for those pixels that have changed as specified by the contents of the delta buffer 60). Action 110 in FIG. 4 thus comprises the determination as to which pixels have changed. This determination may be performed by the graphics subsystem 14 examining the contents of its own update and delta buffers 58 and 60 or the sending system's host processor 40 examining the contents of the graphics subsystem's update and delta buffers 58 and 60 or copies of such buffers as stored in system memory 17.

Figure 5:
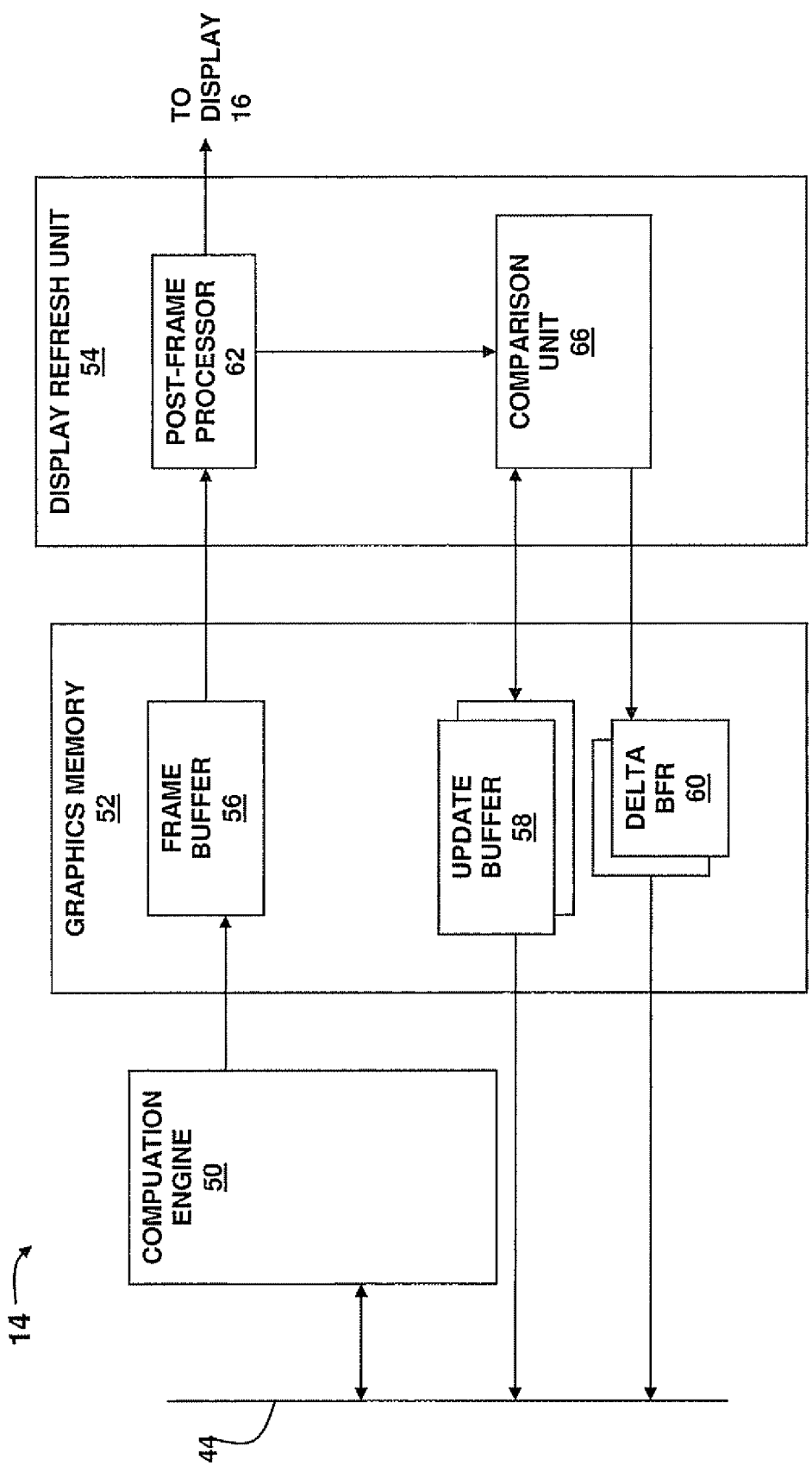
FIG. 5 illustrates a block diagram in which multiple update buffers are used in accordance with various embodiments.

FIG. 5 shows an embodiment in which the graphics memory 52 of the graphics subsystem 14 comprises multiple update buffers 58 and multiple delta buffers 60. In some such embodiments, the graphics memory 17 comprises two update buffers 58 and two delta buffers 60. The following discussion assumes two update and two delta buffers referred to as the "A update buffer," the "B update buffer," the "A delta buffer," and the "B delta buffer." While the comparison unit 66 compares the output pixel bit stream generated from the post-frame buffer processor 62 to the contents of the A update buffer (which contains a preceding image), the some or all of the contents of the B update buffer and the B delta buffer (which contain the results of a previous iteration of the comparison process) are transmitted over the network 25 to the receiving system 30, possibly via system memory 17 as explained above. Then, when the current comparison process with regard to the A update buffer 58 is completed, the roles of the A and B update and delta buffers are swapped, while in other embodiments the contents of the A update and A delta buffers are copied to the B update and B delta buffers. At this point, the comparison process repeats, this time using the B update and B delta buffers 58, 60. While the comparison with regard to the B update and B delta buffers is being performed, some or all of the contents of the A update and A delta buffers are transmitted over the network 25 to the receiving system 30 explained above. The use of the A and B update and delta buffers 58, 60 thus "ping pongs" back and forth. Such use of multiple update and delta buffers is generally more efficient than using only a single update and a single delta buffer.

Other embodiments of using multiple update and delta buffers are possible as well. For example, rather than copying the A update and delta buffers 58, 60 to the B update and delta buffers as explained above, one pair of the update and delta buffers is designated "Current" and the other pair of update and delta buffers is designated "Previous." In this embodiment, the output pixel bit stream generated by the display refresh unit 54 is written into the Current update buffer 58. As pixel data is being written into the Current update buffer 58, such pixel data is compared by the comparison unit 66 with the corresponding pixel data in the Previous update buffer 58. If a difference is found, the Current delta buffer 60 is updated for that particular pixel or region of pixels. When the sending system 12 is ready to compress and send the next image frame to the receiving system 30, the roles of the Previous and Current update and delta buffers 58, 60 are swapped. In at least some embodiments, the act of swapping the roles of the buffers is synchronized to a display retrace period to prevent, for example, image "tearing." In this embodiment, the Current delta buffer 60 is cleared each time the roles are swapped. In some embodiments, the Current delta buffer can be always updated in the case that there are two buffers. Because the compare operations against the previous frame are always occurring against the frame since the last swap, then it is possible to just update the delta buffer.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method, comprising:
storing pixel data in a frame buffer;
retrieving, by a refresh display unit, said pixel data from said frame buffer and processing at least one pixel value of said pixel data to generate an output pixel bit stream, said processing comprising at least one of color-space conversion, color overlay plane implementation, and gamma correction;
storing the pixel values in a first update buffer in a memory device, said pixel values derived from said output pixel bit stream after said processing has been performed;
providing said pixel values from said first update buffer, and not said frame buffer, across a network to a remote graphics system; and
causing, by the refresh display unit, said output pixel bit stream to be copied to a second update buffer.

2. The method of claim 1 further comprising comparing said output pixel bit stream to pixel values previously stored in the first update buffer.

3. The method of claim 2 wherein storing pixel values in the first update buffer comprises overwriting previously stored pixel values in the first update buffer based on the comparison.

4. The method of claim 1 further comprising writing the contents of the first update buffer to system memory.

5. The method of claim 4 further comprising, after beginning to write the contents of the first update buffer to system memory, comparing the output pixel bit stream to the contents of the second update buffer.

6. The method of claim 4 wherein providing said pixel values from said first update buffer across a network to a remote graphics system comprises retrieving a copy of the contents of the first update buffer from system memory and transmitting said copy across said network.

7. A system, comprising:
a receiving system;
a network communicatively coupled to said receiving system
a sending system communicatively coupled to said network and comprising a frame buffer, first and second update buffers, and a display refresh unit that retrieves pixel data from said frame buffer and processes at least one pixel value of said pixel data to generate an output pixel bit stream, said display refresh unit also causes a copy of said output pixel bit stream to be stored in the first update buffer and in the second update buffer;
wherein said sending system causes a subset of the pixel values indicative of said copy of said output pixel bit stream to be transmitted over said network to said receiving system, said subset corresponding to those pixel values in the output pixel bit stream that are different than a previous frame of pixel data.

8. The system of claim 7 the first update buffer updated by said display refresh unit based on a comparison of the output pixel bit stream to contents of said second update buffer.

9. The system of claim 8 wherein said sending system comprises a memory subsystem that contains said frame buffer and said first update buffer.

10. The system of claim 8 said contents of said second update buffer comprises the pixel data representative of a previous image encoded in said output pixel bit stream.

11. The system of claim 7 further comprising a delta buffer and said display refresh unit updates said delta buffer based on results of a comparison of the output pixel bit stream and said contents of the first update buffer.

12. The system of claim 11 wherein each bit in said delta buffer is associated with a separate pixel.

13. The system of claim 11 wherein each bit in said delta buffer is associated with a plurality of pixels.

14. The system of claim 11 further comprising logic that generates said pixel values to be transmitted over the network based on contents of said delta buffer.

15. The system of claim 7 wherein the sending system comprises a post-frame processor that retrieves the pixel data from said frame buffer and processes the retrieved pixel data to perform one or more of color-space conversion, color overlay plane implementation, and gamma correction.

16. A graphics subsystem, comprising:
a memory device comprising a frame buffer and a first update buffer; and
a display refresh unit that retrieves pixel data from said frame buffer and processes at least one pixel value of said pixel data to generate an output pixel bit stream, said display refresh unit also causes a copy of said output pixel bit stream to be stored in the first update buffer; and
logic that causes pixel values indicative of said copy of said output pixel bit stream to be transmitted over a network to a receiving system;
wherein the memory device further comprises a second update buffer, and said display refresh unit also causes a copy of said output pixel bit stream to be stored in the second update buffer.

17. The graphics subsystem of claim 16 wherein said display refresh unit compares said output pixel bit stream to contents of the first update buffer.

18. The graphics subsystem of claim 17 further comprising a delta buffer in which the display refresh unit stores data indicative of whether pixel values in the output pixel bit stream differ from contents of the first update buffer.

19. The graphics subsystem of claim 16 wherein the memory device further comprises first and second delta buffers containing a plurality of bits, each being associated with a plurality of pixels and specifying whether any of the associated pixels have changed.

* * * * *

UNITED STATES PATENT AND TRADEMARK OFFICE
CERTIFICATE OF CORRECTION

| | | |
|---|---|---|
| PATENT NO. | : 7,944,451 B2 | Page 1 of 1 |
| APPLICATION NO. | : 11/830930 | |
| DATED | : May 17, 2011 | |
| INVENTOR(S) | : Roland M. Hochmuth et al. | |

It is certified that error appears in the above-identified patent and that said Letters Patent is hereby corrected as shown below:

In column 8, line 5, in Claim 8, delete "buffer updated" and insert -- buffer is updated --, therefor.

Signed and Sealed this
Eleventh Day of October, 2011

David J. Kappos
*Director of the United States Patent and Trademark Office*